United States Patent [19]
Shimizu

[11] Patent Number: 5,244,055
[45] Date of Patent: Sep. 14, 1993

[54] TRANSPORT CONTROL APPARATUS FOR AUTOMATED GUIDED VEHICLES

[75] Inventor: Shigejiro Shimizu, Ina, Japan

[73] Assignee: Macome Corporation, Tokyo, Japan

[21] Appl. No.: 790,345

[22] Filed: Nov. 12, 1991

[30] Foreign Application Priority Data

Dec. 25, 1990 [JP] Japan .................................. 2-413807

[51] Int. Cl.⁵ ............................................. B60T 7/12
[52] U.S. Cl. .................................. 180/168; 246/115;
246/187 A; 318/587; 324/226
[58] Field of Search ................ 180/167, 168; 246/115,
246/187 A; 318/587; 324/226, 262; 367/909

[56] References Cited

U.S. PATENT DOCUMENTS

| | | | |
|---|---|---|---|
| 3,495,677 | 2/1970 | Wilson | 180/168 |
| 3,512,601 | 5/1970 | Wilson | 180/168 |
| 3,542,148 | 11/1970 | Wilson | 180/168 X |
| 4,003,445 | 1/1977 | De Bruine | 318/587 X |
| 4,284,160 | 8/1981 | DeLiban et al. | 318/587 X |
| 4,630,216 | 12/1986 | Tyler et al. | 180/168 X |
| 4,716,530 | 12/1987 | Ogawa et al. | 318/587 X |
| 4,780,817 | 10/1988 | Lofgren | 180/168 X |
| 4,788,498 | 11/1988 | Uemura | 324/226 X |

FOREIGN PATENT DOCUMENTS

| | | | |
|---|---|---|---|
| 2937075 | 3/1981 | Fed. Rep. of Germany | 318/587 |
| 0105677 | 8/1979 | Japan | 180/168 |
| 0090210 | 3/1990 | Japan | 180/168 |
| 936276 | 9/1963 | United Kingdom | 180/168 |

*Primary Examiner*—Brian Johnson
*Attorney, Agent, or Firm*—Bauer & Schaffer

[57] ABSTRACT

A transport control apparatus for a plurality of automated guided vehicles traveling a transport path having a confluence junction, a turnout or a crossing is comprised of a conductor of a loop-shaped configuration formed to surround the confluence junction, the turnout or the crossing, a magnetic field generating device provided on each of the plurality of automated guided vehicles and generating a magnetic field having a cycle peculiar to each of the automated guided vehicles, a magnetic field detecting device provided on each of the plurality of automated guided vehicles and detecting a magnetic field, wherein when the magnetic field detecting device of a rear automated guided vehicle detects a magnetic field from the loop-shaped conductor induced by the magnetic field generating device of a front automated guided vehicle, the rear automated guided vehicle is halted.

9 Claims, 5 Drawing Sheets

TRANSPORT CONTROL APPARATUS FOR AUTOMATED GUIDED VEHICLES

BACKGROUND OF THE INVENTION

Field of the Invention

The present invention relates to a magnetic guiding system for automated guided vehicles and, more particularly, is directed to a control apparatus for a transport or conveying system having a magnetic guiding system for the vehicles.

Description of the Related Art

In order to prevent collision, in the conventional guiding systems for driverless vehicles (hereinafter referred to as automated guided vehicles), photosensors are provided at the entrance and exit of the confluence intersections, i.e., converging or diverging junctions or crossovers. The photosensors are coupled to a traffic control computer and the respective automated guided vehicles are provided with receivers so that their movements are controlled by a radio signal from the computer.

Thus for example when the photosensor detects that an automated guided vehicle is going to enter an intersection, the computer determines whether or not another vehicle has already entered the same intersection, and, if so, then the second vehicle is halted and only released from the halted state after another photosensor has determined that the first vehicle has reached a position at the exit from the intersection. Thereby collisions between automated guided vehicles at any intersections are avoided.

In the conventional guiding system, the total cost of the hardware involved in the installation of the photosensors, coupling the photosensors to the computer, and connecting the computer to the automated guided vehicles is relatively high. Moreover, the program used by the computer to execute traffic control is comparatively complicated so that the installation of the conventional system into existing buildings, factories or the like, requires a great deal of time as well as effort.

OBJECTS AND SUMMARY OF THE INVENTION

It is an object of the present invention to provide an improved control apparatus for automated guided vehicles in which the aforementioned shortcomings and disadvantages are eliminated.

More specifically, it is an object of the present invention to provide a control apparatus for automated guided vehicles in which the hardware cost is relatively reduced.

Another object of the present invention is to provide a control apparatus for automated guided vehicles which is simplified in arrangement.

Still another object of the present invention is to provide a control apparatus for automated guided vehicles which can be installed in a short period of time.

A further object of the present invention is to provide a control apparatus for automated guided vehicles in which movable bodies can be prevented from colliding with one another.

According to the present invention, control apparatus for a plurality of automated guided vehicles traveling a transport path having intersections such as converging, diverging and crossover junctions is provided comprising a conductor of a loop-shaped configuration formed to surround the intersection, while each vehicle is provided with a magnetic field generating device for generating magnetic field having a cycle peculiar to each of the vehicles, a magnetic field detecting device for detecting a magnetic field, and means for halting the movement of the vehicle when the magnetic field detecting device detects the magnetic field from the loop-shaped conductor induced by the magnetic field generating device of another vehicle.

DESCRIPTION OF THE DRAWINGS

Further objects, features, and advantages of the present invention will be gained from a consideration of the following detailed description of the preferred embodiments thereof, in conjunction with the figures of the accompanying drawings, wherein.

DESCRIPTION OF THE INVENTION

Figure 1:
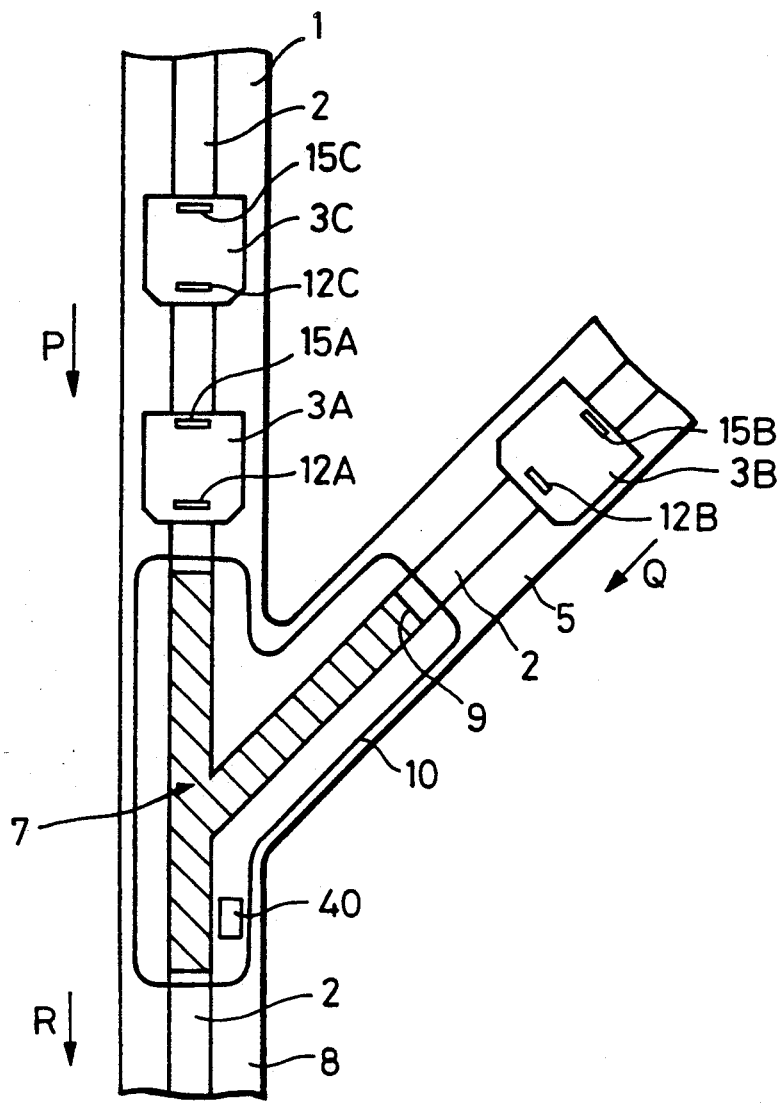
FIG. 1 is a schematic plan view illustrating a layout of a transport control apparatus for automated guiding vehicle according to an embodiment of the present invention.
Figure 2:
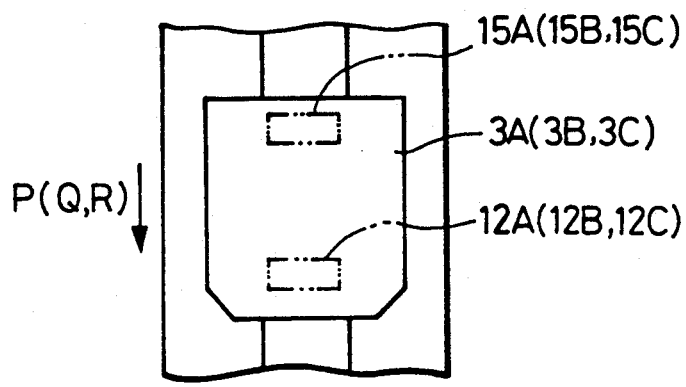
FIG. 2 is a schematic plan view illustrating the relationship between a magnetic field generating coil and a magnetic field detecting coil in an automated guided vehicle forming the control apparatus of the present invention.

In FIG. 1, a transport path 1 is shown on which is bonded a guiding magnetic tape 2 having N and S poles, formed on one and the other surfaces. Automated guided vehicles 3A, 3C are located on the transport path 1, traveling in the direction shown by the arrow P. Further, an automated guided vehicle 3B is shown on a branch transport path 5 traveling in the direction shown on the arrow Q. The transport paths 1 and 5 join together in a transport path 8 at a confluence junction 7 so as to allow the vehicles to travel in the direction shown by an arrow R.

The area 9 at the junction 7 (shaded) represents the area wherein, if more than two automated guided vehicles are at the same time, there is then the danger that these vehicles will collide. This area 9 will hereinafter be referred to as the danger area. In accordance with the present inention, a loop coil 10, made of a conductive material or wire is installed so as to surround the danger area 9. The loop coil 10 may have more than one turn and may be installed either above or beneath the magnetic tape 2.

Conventionally, the automated guided vehicles 3A, 3B, 3C are respectively provided with driving devices such as batteries, motors or the like, though not shown. In accordance with the present invention, however, as shown in FIGS. and 2, the automated guided vehicles 3A, 3B, 3C respectively have reception coils 12A, 12B, 12C disposed at their front ends relative to the travel direction P, Q, R which are adapted to receive a magnetic signal generated from the loop coil 10. Each vehicle also has a transmission coil 15A, 15B, 15C respectively disposed at their rear ends relative to the travel direction P, Q, R which are adapted to transmit a magnetic signal to the loop coil 10. Further, each of the automated guided vehicles 3A, 3B, 3C include control circuits 21A, 21B, 21C respectively, as shown in FIG. 3, and which are respectively connected with the transmission coils 15A, 15B, 15C and the reception coils 12A, 12B, 12C in the vehicle.

Figure 3:
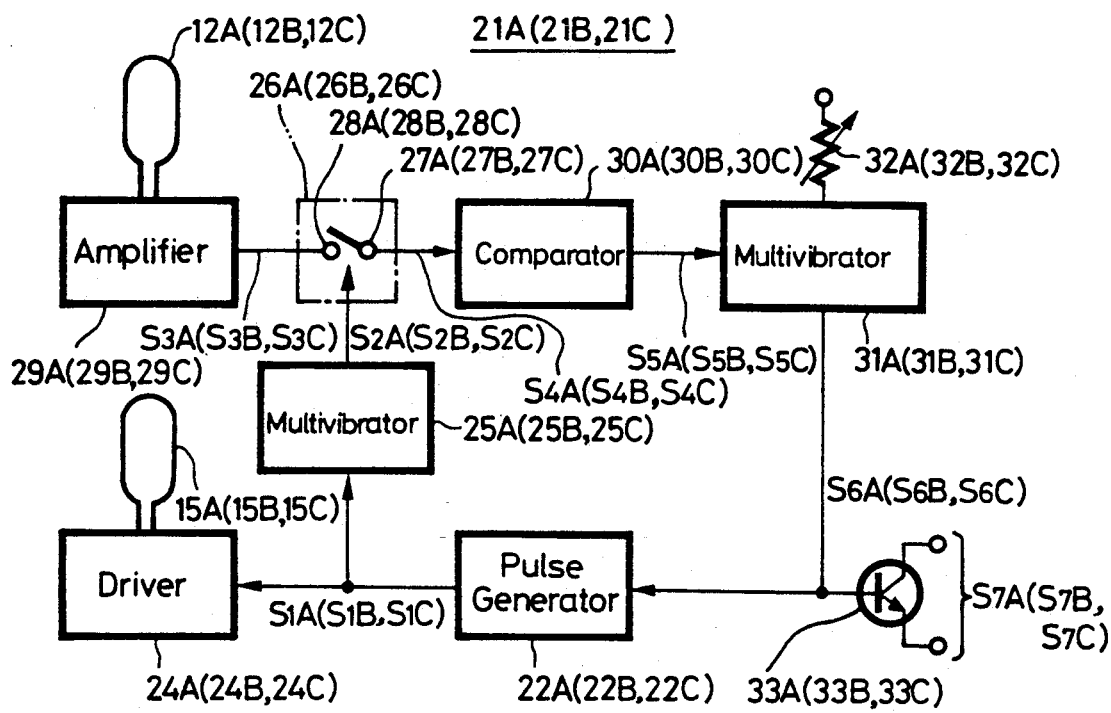
FIG. 3 is a block diagram showing a control circuit installed in the automated guided vehicle shown in FIGS. 1 and 2.
Figure 4:
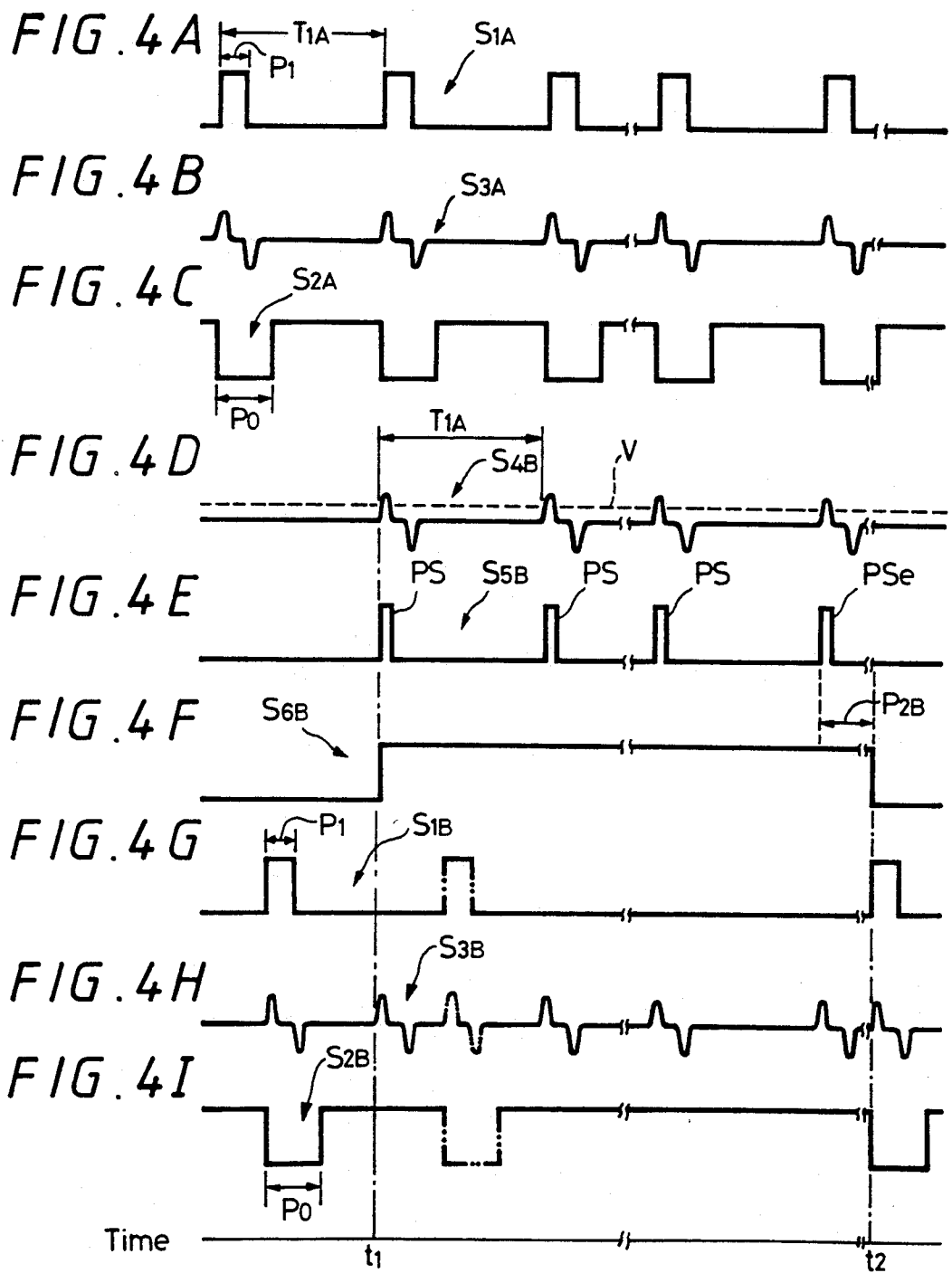
FIGS. 4A to 4I are respectively waveform diagrams to which references will be made in explaining operation of the transport control apparatus when two automated guided vehicles are going to enter the same intersections.

A shown in FIG. 3, each of the control circuits 21A, 21B, 21C respectively include pulse generators 22A, 22B, 22C from which there are derived pulse signals S1A, S1B, S1C. These pulse signals S1A, S1B, S1C have the same pulse duration Pa, but different pulse cycles T1A, T1B, T1C as shown in FIG. 4 These pulse signals S1A, S1B, S1C are respectively supplied through drivers 24A, 24B, 24C to the transmission coils 15A, 15B, 15C and through single-shot multivibrators 25A, 25B, 25C, having a pulse duration P0 (cycle thereof is T1 where P1 < P0 < T1A, T1B, T1C). The pulse signals S1A, S1B, S1C are fed to electronic switches 26A, 26B, 26C formed of gate circuits, as gating signals S2A, S2B, S2C, respectively. The cycles T1A, T1B, T1C of the pulse signals S1A, S1B, S1C are respectively set to be different in each of the automated guide vehicles 3A, 3B, 3C.

The switches 26A, 26B, 26C are adapted to have their movable contacts 27A, 27B, 27C in contact with fixed contacts 28A, 28B, 28C, when the gating signals S2A to S2C are high in level and to be disconnected from the fixed contacts 28A, 28B, 28C when the gating signals S2A to S2C ar low in level.

Reception signals S3A, S3B, S3C, are respectively received by the reception coils 12A, 12B, 12C and amplified by the amplifiers 29A, 29B, 29C. The amplified signals are fed to the fixed contacts 28A, 28B, 28C of the switches 26A, 26B, 26C and their output signals S4A, S4B, S4C are supplied through comparators 30A, 30B, 30C, each having a reference Voltage V, to retriggerable single-shot multivibrators 31A, 31B, 31C which can be varied to predetermined durations by variable resistors 32A, 32B, 32C respectively. These pulse durations are respectively set to P2A, P2B, P2C in response to the automated guided vehicles 3A, 3B, 3C (in a double signs in same order fashion where P2A < P2B , P2C, and T1A to T1C < P2A to P2C). Stop signals S6A, S6B, S6C from these retriggerable single-shot multivibrators 31A, 31B, 31C are respectively supplied to the pulse generators 22A, 22B, 22C and transistors 33A, 33B, 33C.

If the transistors 33A, 33B, 33C are respectively turned on by the stop signals S6A, S6B, S6C of high level, then the automated guided vehicles 3A to 3C are stopped by the receipt of output signals S7A, S7B, S7C.

The technology in which the automated guided vehicles travel on the magnetic tape bonded to the transport path is well-known and described by applicants in Japanese Laid-Open Patent Publication No. 62-184507 (U.S. Pat. No. 4,788,498) and co-pending European Patent Application No. 87300744.7), which for simplicity therefore is not described herein. It is needless to say that the present invention is not limited to the above-mentioned conventional technology in which the automated guided vehicles travel on the magnetic tape but may be applied for example to systems where automated guided vehicles travel by effectively utilizing optoelectronics technology.

Operation of the above-mentioned embodiment will be described below.

In FIG. 1, let is be assumed that the automated guided vehicles 3A, 3B are each traveling on the transport paths 1 and 5 in the directions P and Q while detecting the magnetic field of the magnetic tape 2. The pulse signals S1A and S1B (see FIGS. 4A and 4G) from the pulse generators 22A and 22B are supplied to the transmission coils 15A and 15B throughout the drivers 24A and 24B to generate magnetic fluxes (or magnetic signals). The thus generated signals are received by the reception coils 12A and 12B of the automated guided vehicles 3A and 3B, amplified by the amplifiers 29A, 29B and then fed to the fixed contacts 28A and 28B of the switches 26A and 26B as the reception signals S3A and S3B (see FIGS. 4B and 4H), respectively.

The gating signals S2A and S2B (see FIGS. 4C and 4I) synchronized with the pulse signals S1A and S1B are supplied from the single-shot multivibrators 25A and 25B to the switches 26A and 26B, respectively. The switches 26A and 26B are opened (i.e., turned off) during the period of the pulse duration P0, whereby the reception signals S3A and S3B are masked, thus placing the output signals S4A and S4B of the switches 26A and 26B in the disabled state. Accordingly, the stop command signals S6A and S6B are kept low in level, allowing the automated guided vehicles 3A, 3B to travel in the directions P and Q, respectively. In other words. the automated guided vehicles 3A, 3B (3C) are designed so as not to be stopped in response to the magnetic signals thereof produced externally of the danger area 9.

Figure 5:
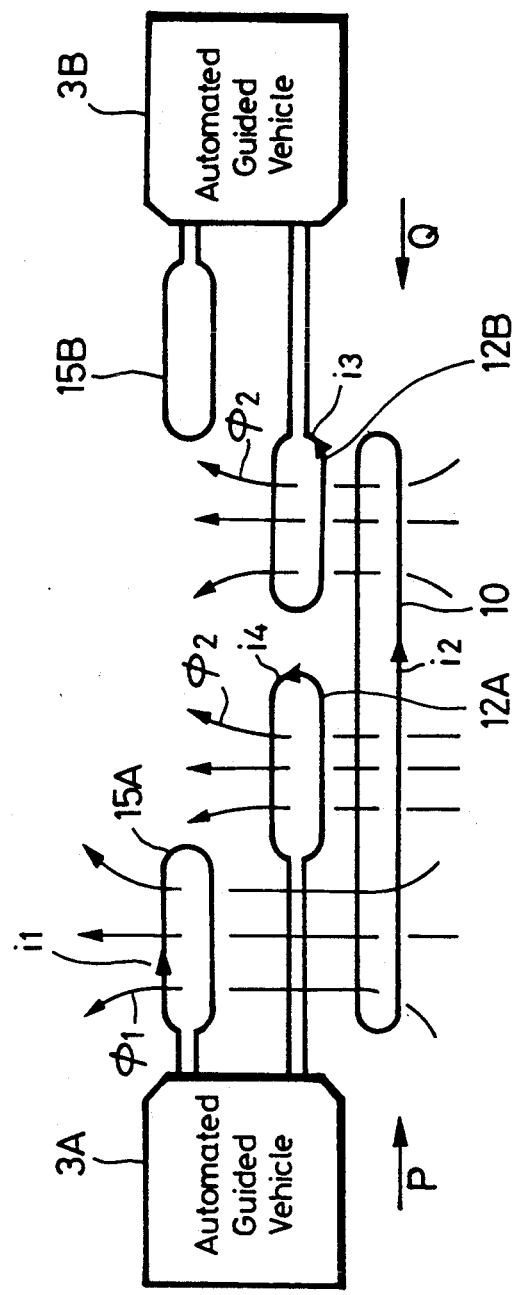
FIG. 5 is a schematic diagram of a principle of the present invention, and to which references will be made in explaining operation of the embodiment of the transport control apparatus.

In this state, assuming that the first automated guided vehicle 3A now enters the area within the loop coil 10 surrounding the danger area 9 at timing point t1. As shown in FIG. 5 an inductive current i2 is then generated in the loop coil 10, based on the magnetic flux 01 produced by the current il flowing through the transmission coil 15A (the transmission coil 15A of the automated guided vehicle 3A constitutes the primary circuit and the loop coil 10 constituting the secondary circuit). As a result, a magnetic flux 02 is generated by the loop coil 10. Should the second automated guided vehicle 3B now seek to enter the area of the loop coil 10, the magnetic flux 02 passes through its reception coil 12B mounted at its front end inducing a further current i3 in the reception coil 12B. Due to the inductive current i3, a reception signal S3B (synchronized with the pulse signal S1A) as shown in FIG. 4H is supplied to the switch 26B (see the timing point t1). Thus, since the gating signal S2B is at high level (see FIG. 4I), the switch 26B is placed in the closed state (i.e., in the on state), whereby the reception signal 23B is supplied to the comparator 30B as an output signal S4B (see FIG. 4D).

The comparator 30B compares the output signal S4B with a reference voltage V (see FIG. 4D) generates an output signal S5B (see FIG. 4E) of a square wave shape. This square wave output signal S5B is supplied to a retriggerable single-shot multivibrator 31B with the result that the retriggerable single-shot multivibrator 31B generates a stop signal S6B which changes from low to high level at substantially the timing point t1. Since the transistor 33B is turned on by a stop command signal S6B of high level, the second automated guided vehicle 3B to enter the danger area 9, is stopped near the entrance to the danger area 9 in response to the output signal S7B of the transistor 33B.

The pulse duration P2B (pulse duration set in response to only one pulse PS of the output signal S5B) of the retriggerable single-shot multivibrator 31B is selected to be longer than the cycle T1A (pulse interval of the output signal S5B). Consequently, the automated guided vehicle 3B is kept in the stopped state during the time pulse PS of the output signal S5B is supplied, i.e., until the first automated guided vehicle 3A goes through and leaves the danger area 9.

After a predetermined period of time, corresponding to the pulse duration P2B after the last pulse PSe (see FIG. 4F), the stop command signal S6B derived from the retriggerable single-shot multivibrator 31 is changed from high to low level. Thus, the halted automated guided vehicle 3B, starts its travel once more. The pulse generator 22B of the second automated guided vehicle 3B is then also energized so that, this time, a magnetic field derived from the automated guided vehicle 3B is generated in the loop coil Accordingly, in this state, even if a third automated guided vehicle such as vehicle 3C seeks to enter the danger area 9, then as a result of a similar operation as described above, this third automated guided vehicle 3C will be halted at the entrance to the danger area 9.

According to this described embodiment, since the reception coils 12A, 12B, 12C on the vehicles are disposed in front of the transmission coils 15A, 15B, 15C, the automated guided vehicle 3B second to enter the danger area 9 receives the magnetic signal from the loop coil 10 in its reception coil immediately on entering the area danger 9 so that it can be stopped reliably before significantly entering the junction. The two automated guided vehicles 3A, 3B are inhibited from existing within the danger area 9 at the same time as a result of which the two vehicles 3A, 3B are prevented from colliding with each other.

If the second and third automated guided vehicles 3B, 3C enter the danger area 9 at the same time the first automated guided vehicle 3A is traveling through the danger area 9, then the automated guided vehicles 3B and 3C are both halted. Further, even when the first automated guided vehicle 3A goes past the danger area 9 to travel fully on the transport path 8 only the automated guided vehicle 3B or 3C having the shorter pulse duration P2B, P2C is given priority over the other and starts its travel. This is effected because the pulse durations P2B and P2C of the retriggerable single-shot multivibrators 31B and 31C are different. Therefore, similarly as described above, the vehicles 3B, 3C are inhibited from entering the danger area 9 at the same time, thereby being protected from collision.

Incidentally, in FIG. 1, reference numeral 40 depicts a distinct magnetic field generating means such as a coil or the like which is located, for example, within the danger area 9. When this magnetic field generating means 40 is manually placed into operation to generate a magnetic field, then any automated guided vehicle can be halted before entering the danger area 9 similarly as described above. Thus, if an object or obstacle, which will disturb the travel of any one of the automated guided vehicles, exists in the transport path 8 after the danger area 9, then the automated guided vehicle may be halted merely by exciting the magnetic field generating means 40.

Figure 6:
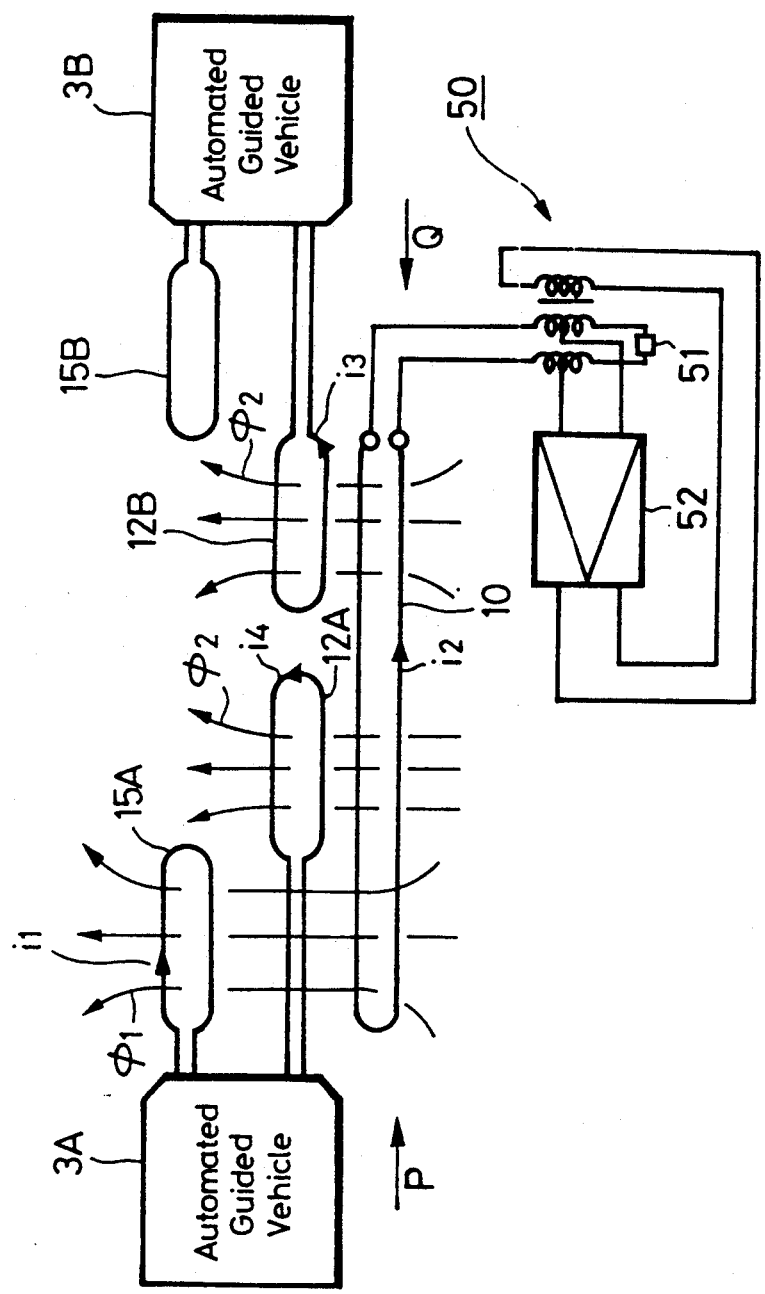
FIG. 6 shows a schematic diagram of the transport control apparatus according to another embodiment of the present invention.

FIG. 6 shows a second embodiment of the control apparatus according to the present invention. In FIG. 6, like parts corresponding to those of FIG. 5 are marked with the same references and therefore need not be described in detail.

According to the embodiment shown in FIG. 6, the current i2 flowing through the loop coil 10 is amplified by a tertiary transformer 50, having a matching impedance 51 and an amplifier 52. Thus detection sensitivity at the reception coil 12B is increased. With this arrangement, the transport control apparatus becomes resistant to noise and can be operated more reliably.

According to a first aspect of the present invention, when one automated guided vehicle enters the intersection or the like which is surrounded by the loop coil, a magnetic field is generated in the loop coil by the magnetic field produced by the transmission coil in this same vehicle. This has the result that a second vehicle receives the magnetic signal from the loop coil in its reception coil and this second vehicle is halted near the entrance of the intersection. There is then the effect such that two automated guided vehicles can be prevented from traveling at the same time in or through the intersection, and the two automated guided vehicles are prevented from colliding with each other.

In accordance with a second aspect of the present invention, the pulse durations of the output pulses of the timer circuits in the automated guided vehicles may be set to different values. Thus, when the magnetic signal from the loop coil is simultaneously detected by the respective reception coils of two automated guided vehicles, the two automated guided vehicles are both halted. Thereafter the one automated guided vehicle, which has finished its counting of the pulses earlier than the other, is permitted to travel first. Thus, even when more than two automated guided vehicles enter the intersection or the like at the same time, both automated guided vehicles are prevented from colliding with one another.

Furthermore, the present invention can achieve the following effects:

(1) Fundamentally, by merely forming the loop coil to surround the intersection and by disposing the transmission and reception coils on the automated guided vehicle, it is possible to simply carry out traffic control and prevent collision at any type of intersection turnout or crossing;

(2) Since the loop coil, while functioning as a sensor, is a passive element, it has excellent reliability as compared with the prior art systems in which the sensor is an active element;

(3) Since special sensors need not be provided at the intersection, the apparatus of the present invention need not be connected to a computer, thereby saving the connection cost as well as the cost for the computer;

(4) The apparatus of the present invention can be additionally applied to existing transport paths and systems with ease;

(5) The loop coil used in the present invention is free of the maintenance;

(6) The number of automated guided vehicles can be increased and/or decreased with ease; and (7) The transport control apparatus of the present invention is relatively inexpensive, including the cost of installation process for the transport control apparatus.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined by the appended claims.

What is claimed is:

1. In a transport system having a plurality of automated guided vehicles moving along a defined path having intersections for entering, leaving and crossing said path, apparatus for controlling the passage of said vehicles at said intersections comprising generating means on each of said vehicles for producing a magnetic field, sensing means on each of said vehicles for detecting a magnetic field and producing an output while sensing the magnetic field, a loop-shaped conductor surrounding each of selected ones of said intersections, said loop-shaped conductor being responsive to the magnetic field produced by the generating means in the first of said vehicles approaching within an area of said loop-shaped conductor to produce an induced magnetic field to be detected by the sensing means on subsequent vehicles approaching the area of said loop-shaped conductor, means for halting the movement of said subsequent vehicles in response to the existence of the output produced by said sensing means and the sensing means in each vehicle includes means for differentiating the magnetic field produced by the generating means in said vehicle from the magnetic field induced by another vehicle in said loop-shaped conductor.

2. The apparatus according to claim 1, wherein said generating means includes means for producing a magnetic field having a cycle peculiar to each of the automated guided vehicles.

3. The apparatus according to claim 1, wherein the output of said detector in each of said automated guided vehicles includes a timer circuit for measuring a predetermined variable time.

4. The apparatus according to claim 3, wherein said timer circuit is composed of a retriggerable one-shot multivibrator and a variable resistor.

5. The apparatus according to claim 1, wherein said magnetic field generating means is mounted at a rear of each of said automated guided vehicles and said magnetic field detecting means is mounted on a front of each of said automated guided vehicles.

6. The apparatus according to claim 1, wherein each of said automated guided vehicles has a unique signal cycle.

7. The apparatus according to claim 1, further comprising a second magnetic field generating means within the area of said loop-shaped conductor at said intersection.

8. The apparatus according to claim 1, including amplifying means connected to said loop-shaped conductor to amplify a current when said current is induced in said conductor.

9. The apparatus according to claim 1, wherein a transport path is defined by an elongated magnet.

* * * * *